(12) United States Patent
Wu et al.

(10) Patent No.: US 7,651,025 B2
(45) Date of Patent: Jan. 26, 2010

(54) GUEST-SERVICE-TYPE CONVENIENCE SYSTEM FOR IMPLEMENTATION AT TICKETING ACTIVITY, TOURING ACTIVITY AND RETAIL TRANSACTION

(75) Inventors: Bo-Chen Wu, Hsinchu (TW); Li-Jueng Tseng, Hsinchu (TW); Bing-Chen Kuo, Hsinchu (TW); John D. H. Mai, Hsinchu (TW); Chung-En Kao, Hsinchu (TW)

(73) Assignee: Industrial Technology Research Institute, Chutung Hsinchu (TW)

( * ) Notice: Subject to any disclaimer, the term of this patent is extended or adjusted under 35 U.S.C. 154(b) by 721 days.

(21) Appl. No.: 11/292,498

(22) Filed: Dec. 1, 2005

(65) Prior Publication Data

US 2007/0045412 A1    Mar. 1, 2007

(30) Foreign Application Priority Data

Aug. 29, 2005    (TW) ............................. 94129563 A

(51) Int. Cl.
    *G06K 5/00*    (2006.01)
(52) U.S. Cl. .................... 235/380; 235/492; 235/451; 235/487
(58) Field of Classification Search .................. 235/380, 235/487, 492, 451, 486, 383, 435; 340/10.1–10.3
    See application file for complete search history.

(56) References Cited

U.S. PATENT DOCUMENTS 7,446,646 B2 *    11/2008    Huomo ...................... 340/10.1

2003/0155413 A1 *    8/2003    Kovesdi et al. .............. 235/375
2004/0263319 A1    12/2004    Huomo
2005/0052283 A1 *    3/2005    Collins et al. ............ 340/572.7

FOREIGN PATENT DOCUMENTS

| CN | 1119378 A | 3/1996 |
|---|---|---|
| CN | 1677425 A | 10/2005 |
| CN | 1702663 A | 11/2005 |
| EP | 0 347 491 | 6/1988 |
| JP | 2002352279 A | 12/2002 |
| JP | 2003150875 A | 5/2003 |
| JP | 200517208 A | 1/2005 |
| WO | 2004006176 A2 | 1/2004 |
| WO | WO 2005/055572 A1 | 6/2005 |
| WO | WO 2007076095 A2 * | 7/2007 |

* cited by examiner

Primary Examiner—Edwyn Labaze
(74) Attorney, Agent, or Firm—Haverstock & Owens LLP

(57) ABSTRACT

An RFID system, which operates at different frequencies, for information interchange is provided. The system includes a user RFID module and a proprietor RFID module. The two RFID modules include a tag and a tag reader which operate at different frequencies, respectively. The frequency of the tag of the proprietor RFID module is the same as that of the tag reader of the user RFID module. According to the frequency, the data in the proprietor RFID module is able to be read by the tag reader of the user RFID module. The frequency of the tag reader of the proprietor RFID module is the same as that of the tag of the user RFID module. According to the frequency, the data in the user RFID module is able to be read by the tag reader of the proprietor RFID module.

20 Claims, 3 Drawing Sheets

GUEST-SERVICE-TYPE CONVENIENCE SYSTEM FOR IMPLEMENTATION AT TICKETING ACTIVITY, TOURING ACTIVITY AND RETAIL TRANSACTION

FIELD OF THE INVENTION

The present invention relates to a guest-service-type convenience system for the implementations at a ticketing activity, a touring activity and a retail transaction, especially to a commercial service system and the method thereof using the Radio Frequency Identification (RFID).

BACKGROUND OF THE INVENTION

In order to help visitors understand the relevant information of an amusement park, a museum or an exhibition hall, a guide service is usually a good choice for the people working in these places to adopt. The common guide services and their drawbacks are as follows:

(1) Arrangement of a Guide Announcer

Usually a guide announcer leads a group of visitors and introduces the relevant information for them. In this way, the number of visitors per announcer is limited and the efficiency of the procedure is low. Hence, this way is difficult to satisfy everyone in this group.

(2) Arrangement of Guide Software

In this way, the visitors operate the guide software to obtain the relevant information. However, the content of the guide software is arranged according to the original sequence that the designers choose. Therefore, this inflexible sequence makes the guide software inconvenient for the visitors.

(3) Arrangement of a Broadcast

The visitors have to wait until the next broadcast begins in order to get the complete information or guide if they miss the beginning of the broadcast. Hence, this way is not efficient in practice.

Besides the inconvenience of the guide function, for ride ticket purchase and various consumer retail transactions after the visitors enter the amusement park, it is necessary to pay cash or use credit cards. It is not only an extra burden but also risky having to carry cash or credit card around for possible purchases or spending. Budgeting spending for children is especially challenging when they are out touring attractions or participating in events.

SUMMARY OF THE INVENTION

For overcoming the mentioned drawbacks in the prior art, the present invention provides a commercial service system using Radio Frequency Identification (RFID) technology. A visitor in an amusement park or an exhibition hall is able to complete ticketing, touring and purchasing merely by means of a microchip module installed in a mobile phone, via a wireless electronic transmission.

According to the first aspect of the present invention, an RFID system, which operates at different frequencies, for information interchange is provided. The system includes a user RFID module and a proprietor RFID module. The two RFID modules, each consists of a tag and a tag reader which operate at different frequencies, respectively. The frequency of the tag in the proprietor RFID module is the same as that of the tag reader in the user RFID module. According to the frequency, the data in the proprietor RFID module can be read by the tag reader of the user RFID module. The frequency of the tag reader of the proprietor RFID module is the same as that of the tag in the user RFID module. According to the frequency, the data in the user RFID module can be read by the tag reader of the proprietor RFID module.

According to the second aspect of the present invention, a multi-frequency Radio Frequency Identification (RFID) system is provided. The system includes at least a user interface card for a user and a proprietor interface device for a proprietor. The user interface card includes a user tag operating at a first frequency and a user reader operating at a second frequency. The proprietor interface device includes a proprietor tag operating at the second frequency and a proprietor reader operating at the first frequency.

According to the third aspect of the present invention, a Radio Frequency Identification (RFID) method is provided. The method includes steps for providing a user interface card and a proprietor interface device wherein the user interface card includes a user tag and a user reader and the proprietor interface device includes a proprietor tag and a proprietor reader, reading the user tag at a first frequency with the proprietor reader, and reading the proprietor tag at a second frequency with the user reader.

According to the fourth aspect of the present invention, a Radio Frequency Identification (RFID) module operating at different frequencies is provided. The module includes at least a first tag having therein a data and operating at a first frequency, a second tag operating at a second frequency different from the first frequency, and a tag reader operating at the first frequency for reading the data of the first tag.

Preferably, the user interface card is installed in a mobile communication device utilized by the user.

Preferably, the mobile communication device is a mobile phone.

Preferably, the multi-frequency RFID system is used for dealing with a commercial activity between the proprietor and the user.

Preferably, the commercial activity includes one selected from a group consisting of a ticketing activity, a touring activity and a consumer retail transaction.

Preferably, the proprietor reader reads the first frequency of the user tag to identify the user uniquely and the ticketing activity is implemented.

Preferably, the user reader reads the second frequency of the proprietor tag to download data and the touring activity is implemented.

Preferably, the data includes words and maps.

Preferably, the user interface card includes an e-wallet and the proprietor interface device interacts with said e-wallet to perform the commercial activity.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
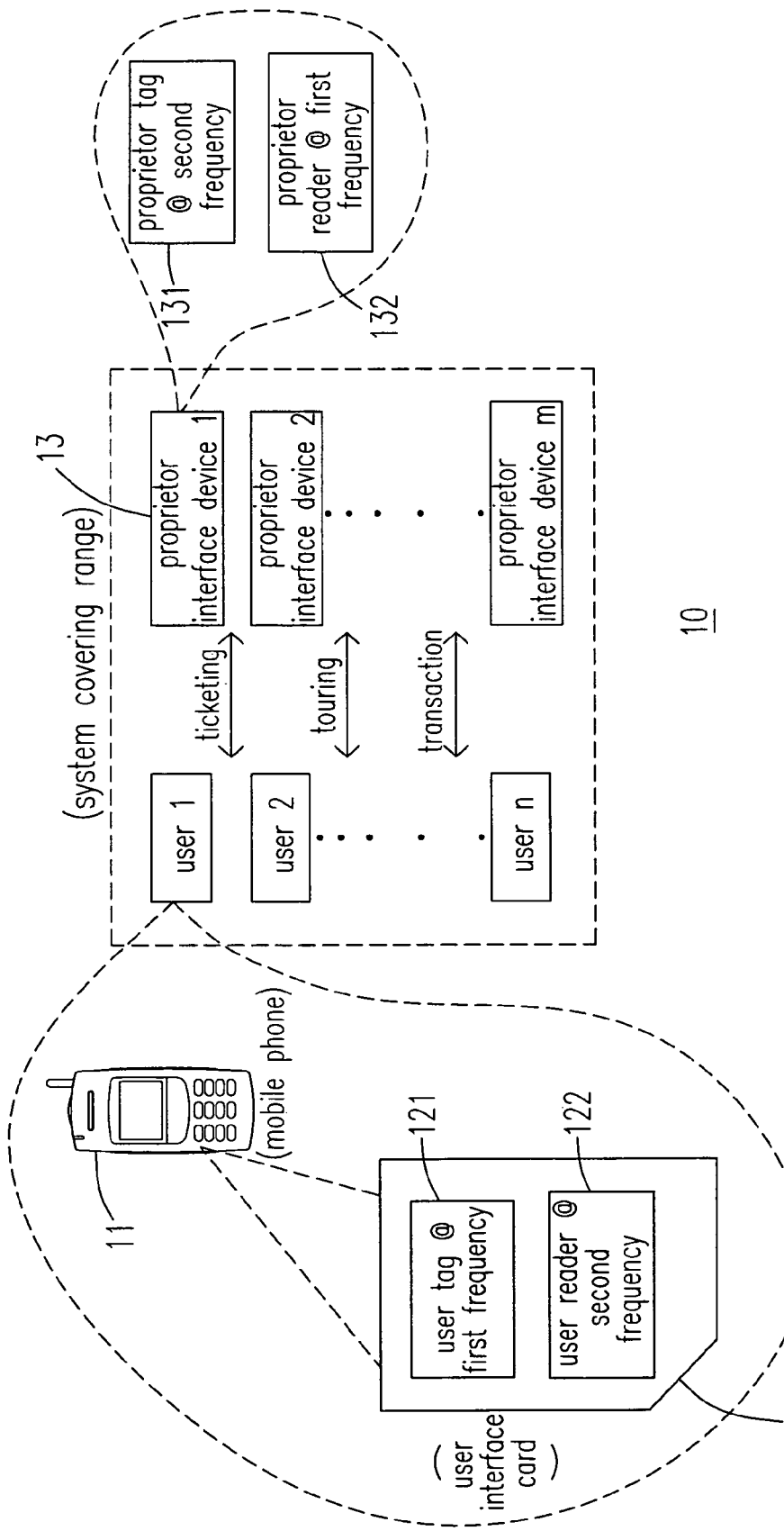
FIG. 1 is a diagram showing a commercial activity system using the multi-frequency RFID technology according to a preferable embodiment of the present invention.

Please refer to FIG. 1, which is a diagram showing a commercial activity system using the multi-frequency RFID technology according to a preferable embodiment of the present invention.

In FIG. 1, the multi-frequency RFID system 10 is composed of a user interface card 12 installed into a mobile communication device 11, e.g. a mobile phone, and a proprietor interface device 13. The user interface card 12 includes a user tag 121 operating at a first frequency and a user reader 122 operating at a second frequency. The proprietor interface device 13 includes a proprietor tag 131 operating at the second frequency and a proprietor reader 132 operating at the first frequency.

In FIG. 1, the range of the commercial activity system using the multi-frequency RFID technology covers the whole amusement park, museum or exhibition hall. A visitor having the mobile phone 11 with the user interface card 12 is able to actively participate in a ticketing activity, a touring activity and a consumer retail transaction in the amusement park, the museum, or the exhibition hall just with the user interface card 12 of the mobile phone 11 in an electronic transmission way.

Figure 2:
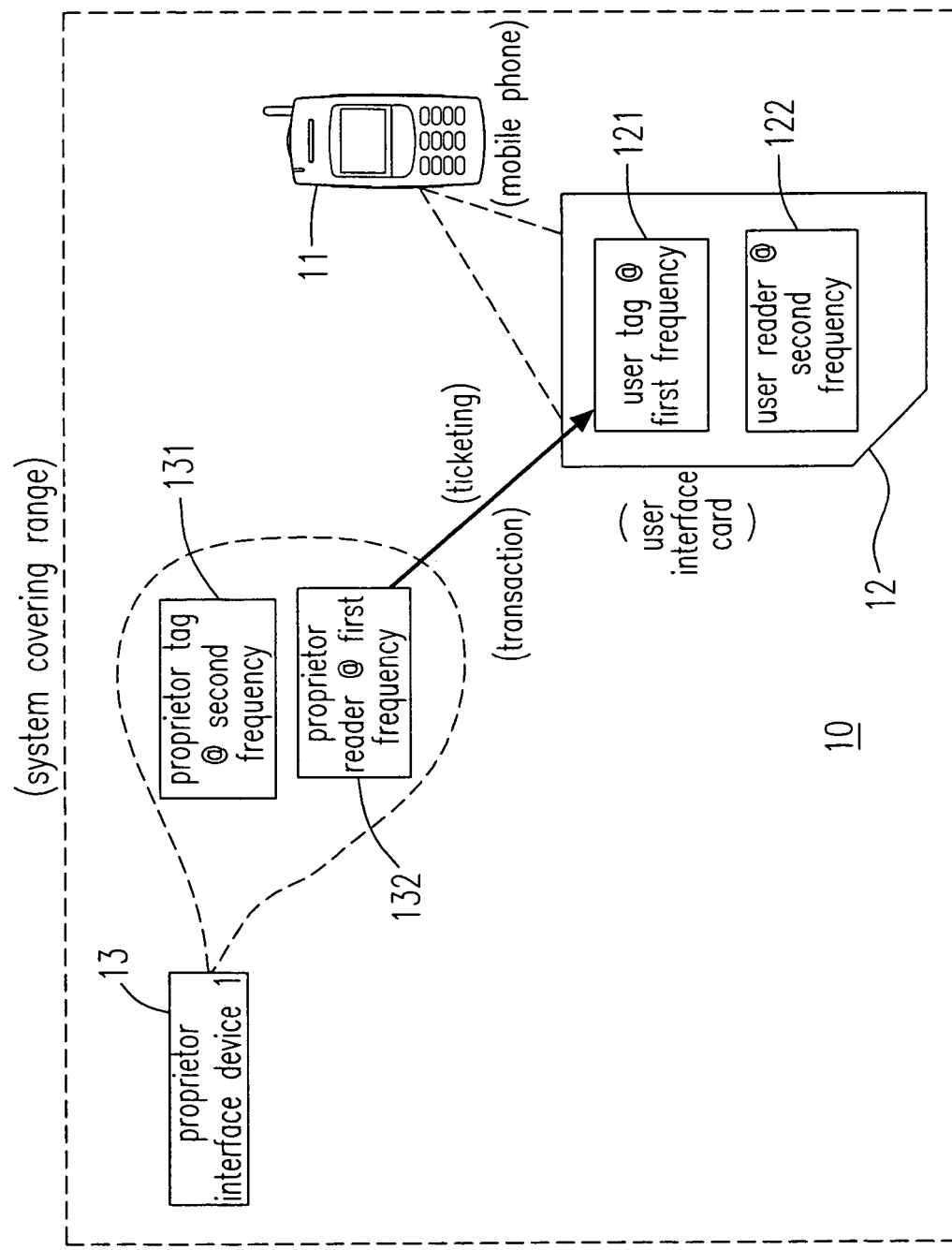
FIG. 2 is a diagram showing the commercial activity system using the multi-frequency RFID technology to perform a ticketing activity and a retail transaction according to the present invention.

Please refer to FIG. 2, which is a diagram showing the commercial activity system using the multi-frequency RFID technology to perform a ticketing activity and a retail transaction according to the present invention.

When a visitor would like to buy a ticket to the amusement park, the museum or the exhibition hall, the proprietor reader 132 near the spot that the visitor lies in will read the first frequency of the user tag 121 of the user interface card 12 in the mobile phone 11. Through the RFID technology, the proprietor reader 132 will be able to identify uniquely the user so that the ticketing activity is implemented. This commercial activity of using the RFID technology to perform the ticketing activity can also be combined with the known payment functions, such as an e-wallet which is used to pay in advance or any function which is used to pay after the activity, etc.

When a visitor would like to perform a retail transaction, e.g. shopping, in the amusement park, the museum or the exhibition hall, the proprietor reader 132 near the spot that the visitor lies in will read the first frequency of the user tag 121 of the user interface card 12 in the mobile phone 11. Through the RFID technology, the proprietor reader 132 will be able to identify uniquely the user so that the retail transaction is implemented. This retail transaction activity is also able to be combined with the known payment functions, such as an e-wallet which is used to pay in advance or any function which is used to pay after the activity, etc. The e-wallet is operated in a lower frequency of the two different frequencies to interact with the proprietor interface device for performing those commercial activities. Because the frequency is lower, the remote range is short. By the shorter range some unauthorized or accidental purchases are able to be avoided in the present invention.

Figure 3:
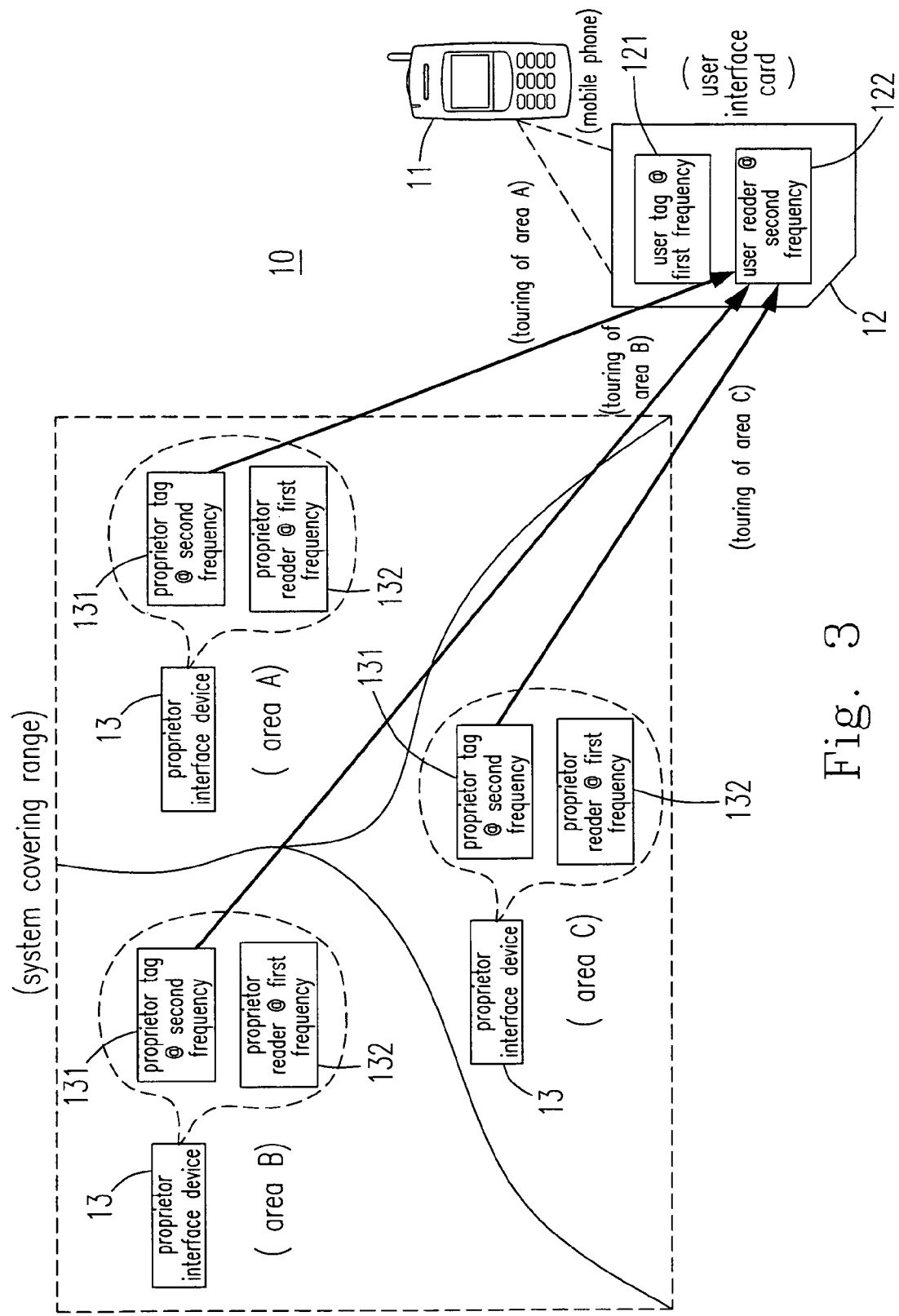
FIG. 3 is a diagram showing the commercial activity system using the multi-frequency RFID technology to perform a touring activity according to the present invention.

Please refer to FIG. 3, which is a diagram showing the commercial activity system using the multi-frequency RFID technology to perform a touring activity according to the present invention.

In this embodiment, the range of the commercial activity system using the multi-frequency RFID technology similarly covers the whole amusement park, museum or exhibition hall. Because the covering range is so wide, plenty of the proprietor interface devices 13 are set to cover the whole amusement park, museum or exhibition hall. For the convenience of the illustration, the range in FIG. 3, is separated into three areas, i.e. area A, area B and area C. Each area owns its proprietor interface device 13 respectively. In practice, there would be possibly hundreds or thousands of the proprietor interface devices 13 set in the range. Besides, a single area may own several proprietor interface devices 13, and the sub-ranges of each area may overlap each other.

In FIG. 3, when a user having the mobile phone 11 with the user interface card 12 is in area A, the user reader 122, operating at the second frequency, of the user interface card 12 will read the proprietor tag 131 of the proprietor interface device 13 in area A, and download the data including a touring content of the park or museum from the proprietor interface device 13 in area A to the mobile phone 11 of the user. The user is then able to be toured by the touring content about area A (even the whole range of the three areas) shown on the display of the mobile phone 11. Similarly, when a user having the mobile phone 11 with the user interface card 12 moves to area B or area C, the user reader 122, operating at the second frequency, of the user interface card 12 will read the proprietor tag 131 of the proprietor interface device 13 in area B or area C, and download the data including a touring content of the park or the museum from the proprietor interface device 13 in area B or area C to the mobile phone 11 of the user. Then the touring activities in area B or area C are able to be implemented.

The present invention relates to a guest-service-type convenience system, using the technology of Radio Frequency Identification (RFID), for the implementations at a ticketing activity, a touring activity and consumer retail transactions. With this system, each visitor to an amusement park, a museum, or an exhibition hall is able to actively complete the implementations of a ticketing activity, a touring activity and a retail transaction just by means of an interface card (microchip) installed in a mobile phone in an electronic transmission way. By this system, visitors in an amusement park, a museum or an exhibition hall are able to be provided an active, real-time, electronic implementation of the ticketing activity, the touring activity and the consumer retail transactions in the park or the hall instead of using cash or credit cards.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A multi-frequency Radio Frequency Identification System (RFID) system, comprising:
    at least a user interface card for a user, comprising:
        a user tag operating at a first frequency; and
        a user reader operating at a second frequency; and
    a proprietor interface device for a proprietor, comprising:
        a proprietor tag operating at said second frequency; and
        a proprietor reader operating at said first frequency, wherein the first frequency is different from the second frequency.

2. The multi-frequency RFID system as claimed in claim 1, wherein said user interface card is installed in a mobile communication device utilized by said user.

3. The multi-frequency RFID system as claimed in claim 2, wherein said mobile communication device is a mobile phone.

4. The multi-frequency RFID system as claimed in claim 1, wherein said multi-frequency RFID system is used for dealing with a commercial activity between said proprietor and said user.

5. The multi-frequency RFID system as claimed in claim 4, wherein said commercial activity comprises one selected from a group consisting of a ticketing activity, a touring activity and a retail transaction.

6. The multi-frequency RFID system as claimed in claim 5, wherein said proprietor reader reads said first frequency of said user tag to identify said user uniquely and said ticketing activity is implemented.

7. The multi-frequency RFID system as claimed in claim 5, wherein said user reader reads said second frequency of said proprietor tag to download data and said touring activity is implemented.

8. The multi-frequency RFID system as claimed in claim 7, wherein said data comprises words and images.

9. The multi-frequency RFID system as claimed in claim 4, wherein said user interface card comprises an e-wallet which is operated in the lower one of said first frequency and said second frequency and said proprietor interface device interacts with said e-wallet in said lower frequency to perform said commercial activity in a short range for the security concern.

10. A Radio Frequency Identification (RFID) method, comprising steps of:
   providing a user interface card and a proprietor interface device, wherein said user interface card comprises a user tag and a user reader and said proprietor interface device comprises a proprietor tag and a proprietor reader;
   reading said user tag at a first frequency with said proprietor reader; and
   reading said proprietor tag at a second frequency with said user reader, wherein the first frequency is different from the second frequency.

11. The RFID method as claimed in claim 10, wherein said user interface card is installed into a mobile communication device.

12. The RFID method as claimed in claim 11, wherein said mobile communication device is a mobile phone.

13. The RFID method as claimed in claim 10, wherein said RFID method is used for dealing with a commercial activity.

14. The RFID method as claimed in claim 13, wherein said commercial activity comprises one selected from a group consisting of a ticketing activity, a touring activity and a retail transaction.

15. The RFID method as claimed in claim 14, wherein said proprietor reader reads said first frequency of said user tag to identify said user uniquely and said ticketing activity is implemented.

16. The RFID method as claimed in claim 14, wherein in said user reader reads said second frequency of said proprietor tag to download data and said touring activity is implemented.

17. The RFID method as claimed in claim 16, wherein said data comprises words and maps.

18. The RFID method as claimed in claim 13, wherein said user interface card comprises an e-wallet which is operated in a lower one of said first frequency and said second frequency and said proprietor interface device interacts with said e-wallet in said lower frequency to perform said commercial activity in a short range for the security concern.

19. A multi-frequency Radio Frequency Identification (RFID) system, comprising:
   at least a user interface card for a user, comprising:
      a user tag operating at a first frequency;
      a user reader operating at a second frequency; and
      an e-wallet operated in a lower one of said first frequency and said second frequency; and
   a proprietor interface device for a proprietor, which interacts with said e-wallet to perform a commercial activity in a short range for the security concern, comprising:
      a proprietor tag operating at said second frequency; and
      a proprietor reader operating at said first frequency, wherein said multifrequency RFID system is used for dealing with said commercial activity between said proprietor and said user.

20. A Radio Frequency Identification (RFID) method, comprising:
   providing a user interface card and a proprietor interface device, wherein said user interface card comprises a user tag, a user reader and an e-wallet and said proprietor interface device comprises a proprietor tag and a proprietor reader;
   reading said user tag at a first frequency with said proprietor reader; and
   reading said proprietor reader tag at a second frequency with said user reader, wherein the first frequency is different from the second frequency, the RFID method is used for dealing with a commercial activity, the e-wallet operated in a lower one of said first frequency and said second frequency, and the proprietor interface device interacts with said e-wallet in said lower frequency to perform the commercial activity in a short range for the security concern.

* * * * *

UNITED STATES PATENT AND TRADEMARK OFFICE
CERTIFICATE OF CORRECTION

PATENT NO.         : 7,651,025 B2                                          Page 1 of 1
APPLICATION NO.    : 11/292498
DATED              : January 26, 2010
INVENTOR(S)        : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Twenty-third Day of November, 2010

David J. Kappos
*Director of the United States Patent and Trademark Office*